(12) United States Patent
Sormunen (10) Patent No.: US 7,987,929 B2
(45) Date of Patent: Aug. 2, 2011

(54) ARRANGEMENT FOR PROCESSING DUST

(75) Inventor: Tapani Sormunen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 505 days.

(21) Appl. No.: 12/094,864

(22) PCT Filed: Nov. 23, 2006

(86) PCT No.: PCT/JP2006/350512
§ 371 (c)(1),
(2), (4) Date: May 23, 2008

(87) PCT Pub. No.: WO2007/060294
PCT Pub. Date: May 31, 2007

(65) Prior Publication Data
US 2010/0320000 A1    Dec. 23, 2010

(30) Foreign Application Priority Data

Nov. 24, 2005  (FI) ...................................... 20055622

(51) Int. Cl.
*E21B 21/07* (2006.01)
(52) U.S. Cl. ....................................................... 175/206
(58) Field of Classification Search .................... 175/66, 175/206, 209; 55/385.5
See application file for complete search history.

(56) References Cited

U.S. PATENT DOCUMENTS

| | | | |
|---|---|---|---|
| 4,223,748 A * | 9/1980 | Barendsen | ...................... 175/66 |
| 4,406,330 A | 9/1983 | Jysky | |
| 6,106,733 A * | 8/2000 | Wood | ........................... 210/774 |
| 6,237,480 B1 | 5/2001 | Kietzer | |
| 6,578,646 B2 * | 6/2003 | Juujavi et al. | ................... 175/66 |

FOREIGN PATENT DOCUMENTS

| | | |
|---|---|---|
| FI | 810499 | 8/1982 |
| JP | 62-254858 | 11/1987 |
| JP | 64-39472 | 2/1989 |
| JP | 5-76803 | 3/1993 |
| JP | 11-247575 | 9/1999 |
| JP | 2000-140799 | 5/2000 |

* cited by examiner

*Primary Examiner* — Daniel P Stephenson
(74) *Attorney, Agent, or Firm* — Drinker Biddle & Reath LLP (57) ABSTRACT

The invention relates to a method for processing dust when breaking rock, to a dust separator, and further to a rock-drilling rig. Rock material and air sucked from a borehole or some other operating location is separated from each other in the dust separator. The separated rock material falls into a discharge part of the dust separator, from which it can be dosed in batches into a discharging device. The discharging device comprises a closed compression space in which the rock material batch is compressed into a more compact state. This forms a solid matter cake that is removed from the dust separator.

23 Claims, 5 Drawing Sheets

ARRANGEMENT FOR PROCESSING DUST

CROSS REFERENCE TO RELATED APPLICATIONS

This application is the National Stage of International Application No. PCT/FI2006/050512, filed Nov. 23, 2006, and claims benefit of Finnish Application No. 20055622, filed Nov. 24, 2005.

BACKGROUND OF THE INVENTION

The invention relates to a method for processing dust when breaking rock, the method comprising sucking broken rock material out of the borehole and transporting it to a dust separator; separating the rock material and air with the dust separator; dosing the separated rock material in batches with a discharging device from the dust separator; and removing the rock material from the dust separator with a displacement feeder.

The invention further relates to a dust separator that comprises a body; at least one suction device for generating suction in the space defined by the body; at least one feed channel for feeding rock material and air to the dust separator; at least one separator for separating the rock material from air; at least one discharge channel, along which the air that has passed through the separator is arranged to be removed from the dust separator; at least one discharging device that is connected to a discharging part of the dust separator and arranged to remove the separated rock material in batches from the dust separator.

The invention yet further relates to a rock-drilling rig that comprises a movable carrier; at least one drilling boom with at least one drill unit comprising a rock drill machine; a dust removal system that comprises at least one dust separator, at least one suction funnel at the drill unit and at least one suction channel for transporting the drilling cuttings formed during drilling from the suction funnel to the feed channel of the dust separator.

In rock drilling, rock is broken with a tool, which generates rock dust that is hazardous to health. Rock-drilling rigs typically have a dust collecting system with which rock material is sucked away from the borehole and filtered in dust separators. The separated rock material can be removed from the dust separator with a discharging device. U.S. Pat. No. 4,406,330 discloses a solution, in which separated rock material is transported with a feeder to a discharge chamber at the bottom of the dust separator, and there a liquid binder is mixed into the rock material with agitator elements, after which the mixture can be ejected from the dust separator. A problem with such a discharging device is its slow operation among other things.

BRIEF DESCRIPTION OF THE INVENTION

It is an object of the present invention to provide a novel and improved method for processing dust, a dust separator, and a rock-drilling rig.

The method of the invention is characterised by dosing the rock material in batches with a displacement feeder into at least one closable compression space; compressing the rock material in at least one closed compression space into a smaller volume before the rock material batch is discharged from the dust separator.

The dust separator of the invention is characterised in that the displacement feeder is arranged to dose the separated rock material in batches into at least one closable compression space; and that the discharging device comprises means for compressing the rock material batch into a smaller volume in at least one closed compression space.

The rock-drilling rig of the invention is characterised in that the dust separator is in accordance with the second independent claim.

The idea of the invention is that the dust separator separates the rock material and air from each other. The separated rock material is removed from the dust separator with the discharging device that comprises a displacement feeder. The displacement feeder doses the rock material in batches into the closable compression space whose volume is arranged to decrease. The discharging device compresses the rock material in the closed compression space and makes it compact.

It is an advantage of the invention that the discharging device compresses the rock material in a closable compression space, whereby the rock material is compacted and obtains a solid state. The dust forms a kind of solid matter cake, from which dust does not substantially spread into the environment at all or at least less than from loose rock material.

The idea of an embodiment of the invention is that rock material is dosed in batches into a closable compression space of a displacement feeder and then the rock material batch is compressed in the closed compression space of the displacement feeder. This solution provides the advantage that dosing and compression can take place simultaneously in the displacement feeder.

The idea of an embodiment of the invention is that rock material is dosed in batches by means of a displacement feeder to a press that comprises at least one compression space and at least one compression element. This solution makes it possible to utilise different displacement feeders and presses in a versatile manner.

The idea of an embodiment of the invention is that a binder is fed among the separated rock material before it is compressed in the compression space. The binder can be fed into an empty compression space in advance before the rock material is dosed therein, or the binder can be fed simultaneously with the rock material into a closable compression space. Further, it is possible to feed the binder among rock material accumulated in the bottom part of the dust separator, before it is moved to the discharging device. This application is preferred for instance when the reaction time of the binder is long.

The idea of an embodiment of the invention is that a binder is fed among the rock material in a closed compression space of a displacement feeder or press after the rock material batch being processed is dosed therein. Because the binder is fed into a closed space, dust binding can be done with a relatively small amount of binder. As the feeding takes place just before compression, it is also possible to use binders with a short reaction time.

The idea of an embodiment of the invention is that the drilling cuttings to be processed are fed moist into the dust separator. Flushing medium fed into the borehole may comprise air and fluid, whereby the cuttings are moist, or alternatively the rock material to be sucked can be separately moistened before filtering. The rock material collecting in the discharging part of the dust separator is then also moist. When moist rock material is compressed in a displacement feeder or press into a smaller volume, it compacts well. It is possible to form the rock material into a solid cake even without a separate binder. On the other hand it is possible to use other than liquid binders, because moist rock material can moisten a powdery or granulate binder, for example, during compression.

The idea of an embodiment of the invention is that both coarse rock material and fine rock material are separated in the same dust separator. The rock material discharged from such an integrated dust separator may comprise coarse rock material separated with a cyclone or the like and fine rock material separated with a fine filter. When the rock material being processed comprises fractions of this type with different coarseness, it is possible to press them into a compact and strong solid matter cake.

The idea of an embodiment of the invention is that the dust separator has a cleaning device with which it is possible to provide inside a filter element a pressure pulse whose direction is opposite to that of the normal filtering suction. The pressure pulse detaches the rock material accumulated on the surface of the filter element and makes it fall to the bottom of the dust separator, from which it can be moved with the displacement feeder out of the dust separator.

The idea of an embodiment of the invention is that there is no direct open connection through the displacement feeder from inside the dust separator to the ambient air. This way no dust can escape during rock material discharge from the dust separator and cause health risks to the operator of the rock-drilling rig. The advantage of this application is emphasized when the dust separator is equipped with a cleaning device. When the construction of the displacement feeder is tight, harmful dust cannot leak due to the pressure pulse given in the dust separator.

The idea of an embodiment of the invention is that the displacement feeder comprises a rotor equipped with flexible radial blades whose rotation axis is arranged eccentrically in the discharge chamber. Between two consecutive blades of the rotor and the inner surface of the discharge chamber, a compression space is formed that is arranged to close and whose volume is arranged to decrease as the eccentrically arranged rotor turns from the feed opening to the discharge opening. The rock material in the compression space then compresses and becomes compact. An advantage of the displacement feeder equipped with a rotating rotor is that it requires little space sideways, which means that positioning the dust separator in the rock-drilling rig is easier. A dust separator equipped with this type of displacement feeder can be arranged close to the drilling site without it impeding the operation or visibility. Further, a displacement feeder equipped with a rotating rotor can be used continuously if necessary, which means that its capacity may be high in spite of its small size.

The idea of an embodiment of the invention is that the displacement feeder comprises a slide that is arranged to move back and forth between a first compression space and a second compression space. When the slide moves into its first direction of travel, it compresses the rock material in the first compression space into a smaller volume and, at the same time, opens a connection between a feed opening and the second compression space so that a new batch of rock material can move into the second compression space. When the slide has sufficiently compressed the rock material in the first compression space, a first discharge channel is opened, and the compressed rock material is discharged from the dust separator. After this, the travel direction of the slide is changed, and the compression of the rock material in the second compression space is started. This type of displacement feeder is simple and strong in construction.

The idea of an embodiment of the invention is that the dust separator is arranged on the drilling boom of the rock-drilling rig. The transport distance of the rock material from the borehole to the dust separator can then be relatively short. A dust collector equipped with a short suction hose may have a good suction capacity. Further, one advantage is that the rock material is not transported past the operator to the back of the rock-drilling rig as in the known solutions. This way it is possible to avoid dust risks caused by possible leaks in the suction hose and other components.

The idea of an embodiment of the invention is that the operation of the displacement feeder is substantially continuous during rock drilling. The operation can be controlled by a control unit.

BRIEF DESCRIPTION OF FIGURES

Some embodiments of the invention are described in more detail in the attached drawings, in which.

In the figures, some embodiments of the invention are shown simplified for the sake of clarity. Similar parts are marked with the same reference numbers in the figures.

DETAILED DESCRIPTION OF SOME EMBODIMENTS OF THE INVENTION

Figure 1:
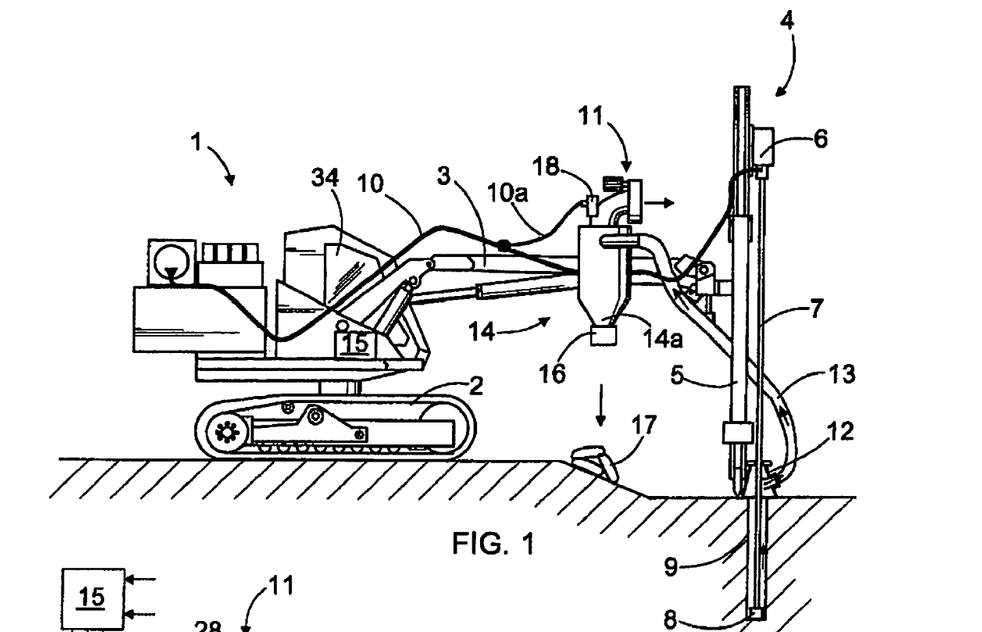
FIG. 1 is a schematic side view of a rock-drilling rig equipped with a dust collection system.

The rock-drilling rig 1 shown in FIG. 1 comprises a movable carrier 2 that may have one or more movable drilling booms 3 arranged to it. The drilling boom 3 may have a drilling unit 4 with at least a feed beam 5 and a rock drill machine 6. The rock drill machine 6 can be moved with the feed beam 5 during drilling, while a percussion device belonging to the rock drill machine 6 provides impact pulses to a tool 7. The drill bit 8 at the outermost end of the tool 7 then breaks rock and the tool 7 penetrates the rock. During drilling, broken rock material, i.e. drilling cuttings, is formed that can be removed from the borehole 9 by feeding from a flushing medium channel 10 air, a mixture of air and water, or some other flushing medium through the tool 7 to the drill bit 8. The flushing medium pushes the drilling cuttings toward the mouth of the borehole 9, from which it can be removed with a collection system belonging to the rock-drilling rig 1.

The collection system comprises one or more suction devices 11 with which a suitable suction can be generated to suck the drilling cuttings from the suction funnel 12 at the mouth of the borehole 9 along a suction channel 13 to a dust separator 14. There may be one or more dust separators 14. Coarse rock material can be separated in a coarse separator, such as a cyclone separator or cyclone, and fine rock material can be separated in a fine separator by means of replaceable filter elements, for instance. Typically the suction channel 13 is a flexible hose. The suction funnel 12 may be a tubular piece whose top and bottom are open so that the tool 7 can be arranged through the suction funnel 12. In the side of the suction funnel 12, there may be a connecting pipe or the like, to which the suction channel 13 is connected. Further, there may be transport means arranged to the suction funnel 12 to transport it relative to the feed beam 5 such that, during drilling, the suction funnel 12 can be moved against the rock being drilled so as to prevent dust escaping into the environment.

The operation of the collection system can be controlled with a control unit 15. The control unit 15 may be arranged to control the suction device 11 and the discharging device 16 at the bottom of the dust separator 14. With the discharging device 16, it is possible to process the rock material accumulated at the bottom of the dust separator 14 and move it out of the dust separator 14. The rock material can be compressed and a binder can be mixed therein in the discharging device 16 so that the rock material exiting the dust separator 16 is in solid bound form, i.e. it is possible to form a kind of cake 17 in the discharging device 16, from which the rock material does not spread as harmful dust into the environment. Such solid matter cakes 17 can be dropped from the discharging device 16 to the ground or recovered. Further, the control unit 15 may control the cleaning device 18 that can generate inside the filters of the dust separator 14 a pressure pulse whose direction is opposite to that of the normal suction flow, whereby the rock material accumulated in the filters can be detached from them and made to drop to the bottom, i.e. the discharging part 14a, of the dust separator. Compressed air can be led to the cleaning device 18 from the flushing medium channel 10, for instance.

Figure 2:
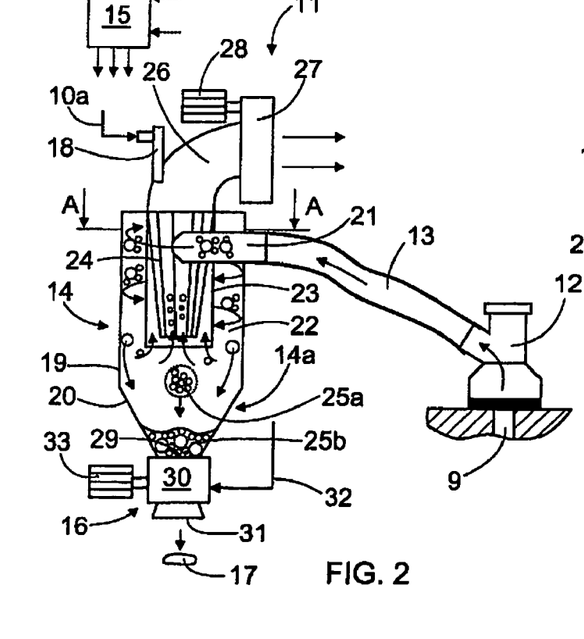
FIG. 2 is a schematic and partly sectional view of a dust collection system of the invention.

FIG. 2 shows a dust separator 14 with a combined coarse separator and fine separator. The dust separator 14 comprises a body 19 that may form a closed casing. At the bottom of the body, i.e. in the discharging part 14a, there may be a conical section 20 for collecting the rock material separated with the dust separator. The rock material to be separated can be brought along the suction channel 13 to a feed channel 21 of the dust separator 14, from which it can be led substantially tangentially to the cyclone-separator, i.e. cyclone 22, that may be formed in the space between the inner surface of the body 19 and an inner pipe 23 at the top of the dust separator 14. The centrifugal force affecting the coarse rock material is greater than that affecting the fine rock material, whereby the coarse rock material hits the inner surface of the body 19 and then drops into the discharging part 14a. The fine rock material can in turn be sucked inside the inner pipe 23 and led to one or more filter elements 24 that allow air to flow through, but retains solid matter. The rock material attached to the surface of the filter element 24 can be detached by providing with the cleaning device 18 to the inside of the filter element 24 a pressure pulse that makes the rock material 25a drop into the discharging part 14a for further processing. The air passing through the filter element 24 can be led to a discharge air channel 26 and released into the ambient air. The suction flow required by the collection equipment can be generated with one or more blowers 27 that can be used with a motor 28. The blower 27 may be arranged into the discharge air channel 26 as shown in FIG. 2, or it may be arranged into the feed channel 21 before the dust separator 14.

At the bottom of the dust separator 14, there may be one or more feed openings 29, through which the rock material 25b accumulated in the discharging part 14a can be moved to a discharge chamber 30 of the discharging device 16, where the rock material is compressed before its removal from the dust separator 14 through a discharge opening 31. Further, a binder can be fed to the discharging device 16 via a channel 32. A drive 33 of the discharging device 16 is also shown in FIG. 2.

The dust separator 14 of FIG. 2 that comprises a coarse and fine separator integrated in a relatively small space, can be arranged on the drilling boom 3 of the rock-drilling rig 1, as shown in FIG. 1. The dust separator 14 is then close to the borehole 9 and the rock material need not be transported far in the suction channel 13. Further, the dust collection equipment is located far away from the control cabin 34 to avoid exposing the operator to dust.

Figure 3:
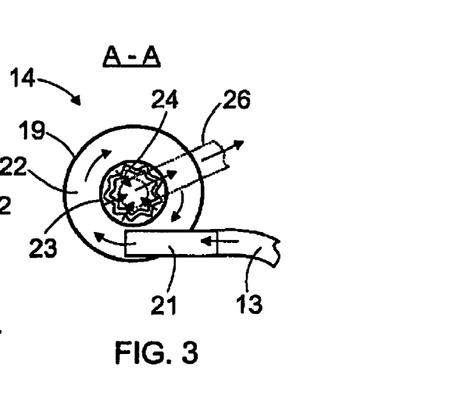
FIG. 3 is a schematic view of the dust separator shown in FIG. 2 and along section A-A.

FIG. 3 shows a cut at A-A of the dust separator 14 of FIG. 2. In FIG. 3, arrows illustrate filtering flows in the dust separator 14.

Figure 4:
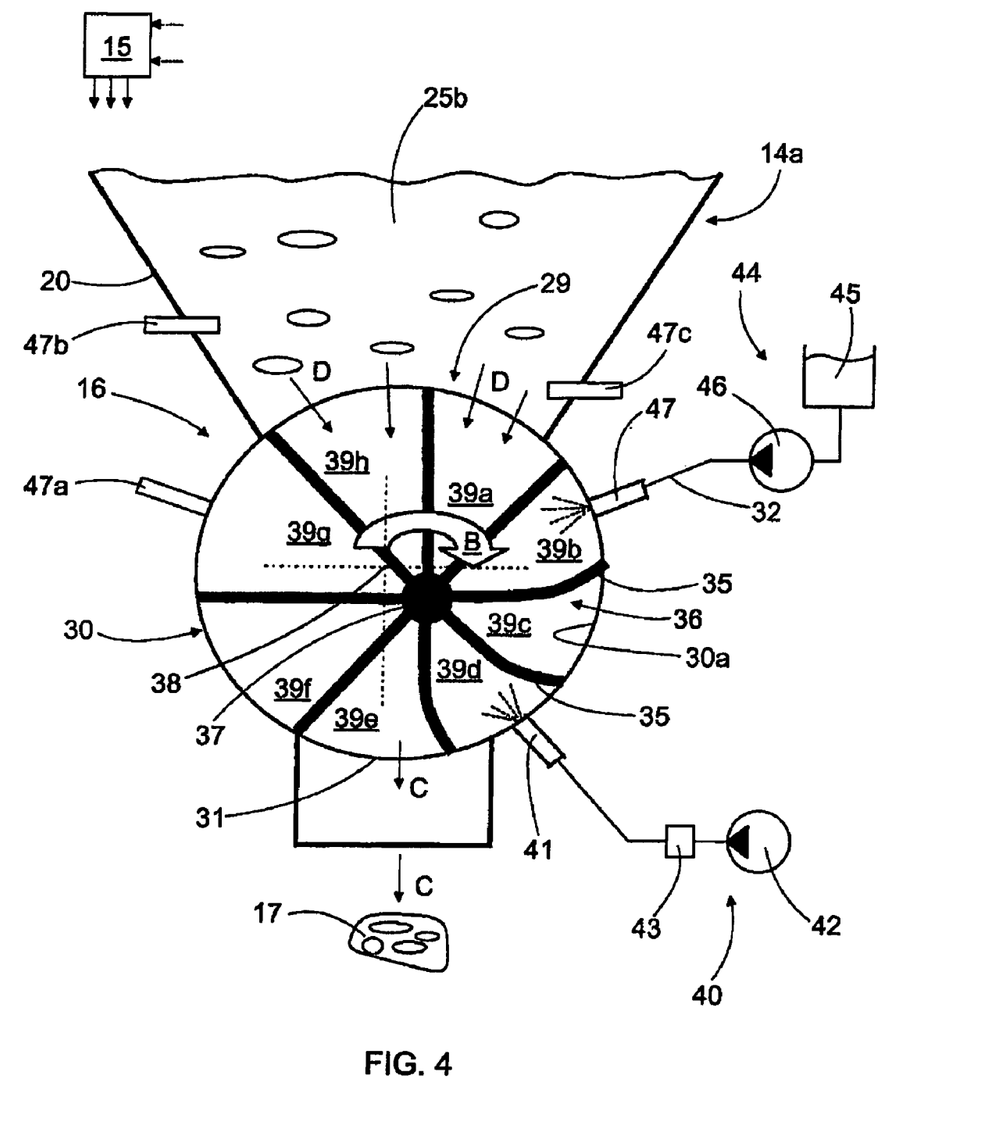
FIG. 4 is a schematic view of a bottom part of a dust separator and means for processing and discharging separated rock material from the dust separator.

FIG. 4 shows an arrangement for removing separated rock material 25b from the discharging part 14a of the dust separator. The discharging device 16 may be a displacement feeder that may comprise a discharge chamber 30 and a rotor 36 equipped with several flexible radial blades 35. The rotation axis 37 of the rotor 36 is arranged eccentrically relative to the centre axis 38 of the discharge chamber 30. The rotor 37 is rotated in direction B, whereby a compression space 39 is formed between two consecutive blades and the inner surface 30a of the discharge chamber, and the chamber is arranged to close after the blades pass the discharge opening 29. There are several compression spaces 39a to 39h, and their number depends on the number of blades 35. Further, the volume of the compression space 39 is arranged to decrease as the eccentrically arranged rotor 36 turns from the feed opening 29 toward the discharge opening 31. The rock material in the compression space 39 then compresses and becomes compact. With the location of the rotation axis 37 of the rotor 36, it is possible to affect the way the compression space 39 decreases: the greater the distance between the rotation axis 37 and centre axis 38 is, the greater the change in volume can be obtained in the compression space 39. The discharging device 16 may comprise regulating elements, with which the position of the rotation axis 37 of the rotor 36 can be adjusted relative to the centre axis 38. This makes it possible to vary the strength of the compression. The regulating elements may include a pressure medium cylinder or motor, or some other actuator that is arranged to move the rotor 36 in transverse direction to the rotation axis 37. Further, it is possible to support the rotation axis 37 flexibly to the compression chamber 30, whereby a force, for instance a spring force, acts continuously on the rotation axis 37 and endeavours to move the rotation axis toward the inner surface 30a of the compression chamber in the section between the feed opening 29 and discharge opening 31.

The compression space 39 opens at the discharge opening 31, and the dust cake 17 formed in the compression space 39 can drop away from the discharging device 16 in the direction shown by arrows C. The emptying of the compression space 39 can be facilitated by feeding with a flushing device 40 a compressed flushing agent, such as compressed air or water, from a flushing nozzle 41 to the opening compression space 39d. The flushing device 40 can be equipped with a pressure source 42 and control element 43, such as a valve, that can be controlled with the control unit 15.

As the rotor 36 turns in direction B, the compression spaces 39e to 39f move empty from the discharge opening 31 to the feed opening 29. When the compression space 39h arrives at the feed opening 29, rock material 25b can move in the manner shown by arrows C into the compression space opening in the feed opening 29 in an amount that at its maximum corresponds to the volume of the compression space. The rotating rotor 36 thus doses rock material 25b away from the dust separator in batches that substantially correspond to the volume of the compression space 39.

The flexible blades 35 of the rotor 36 can drag against the inner surface 30a of the discharge chamber, whereby they can keep the section between the feed opening 29 and discharge opening 31 continuously sealed. The rotor blades 35 can be made of a flexible material, such as polyurethane or some other suitable polymer. Different blades 35 made of composite materials may also be used. Further, the blades may be arranged flexible with their structure, for instance by arranging suitable joints, bending points or the like between otherwise rigid wing components.

FIG. 4 also shows feed equipment 44 for feeding a binder from a container 45 with a pump 46 to a channel 32 and on through a feed nozzle 47 to a compression space 39b that is closed and has started compressing the rock material. The operation of the feed equipment 44 can be controlled with a control unit 15. FIG. 4 also shows some alternative locations for feed nozzles 47a to 47c. The feed nozzle 47a is arranged to feed the binder into an empty compression space 39g before the dosing of the rock material 25b. The feed nozzle 47b is arranged to feed the binder among the rock material 25b accumulated in the discharge part 14a before the dosing, and further, the feed nozzle 47c is arranged to dose the binder simultaneously with the rock material 25b. It is also possible to use various combinations of the presented feeding methods.

Figure 5A:
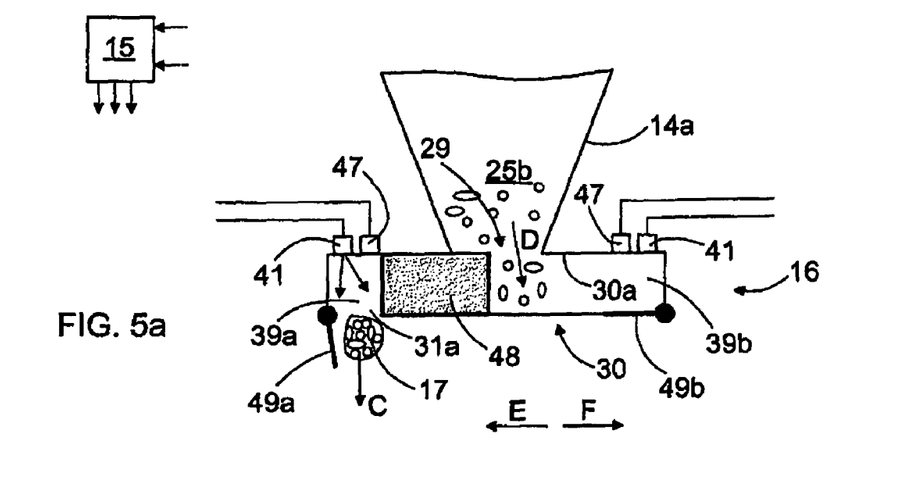
FIGS. 5a to 5c are schematic views of an alternative arrangement for discharging separated rock material from a dust separator.
Figure 5B:
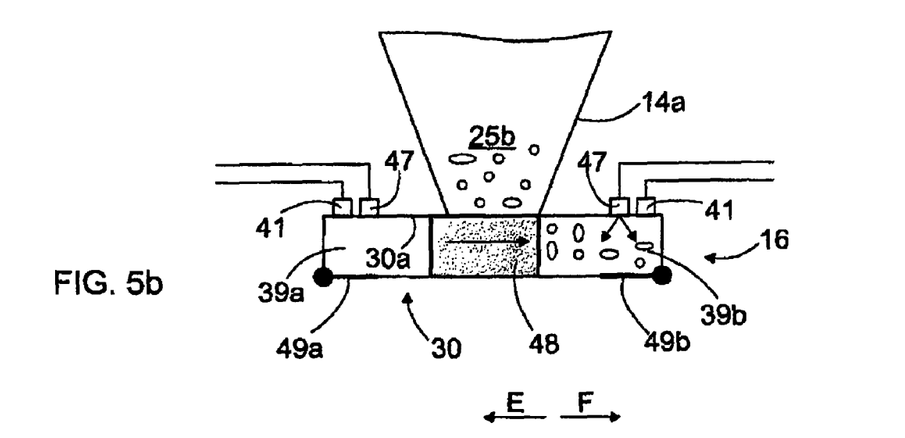
Figure 5C:
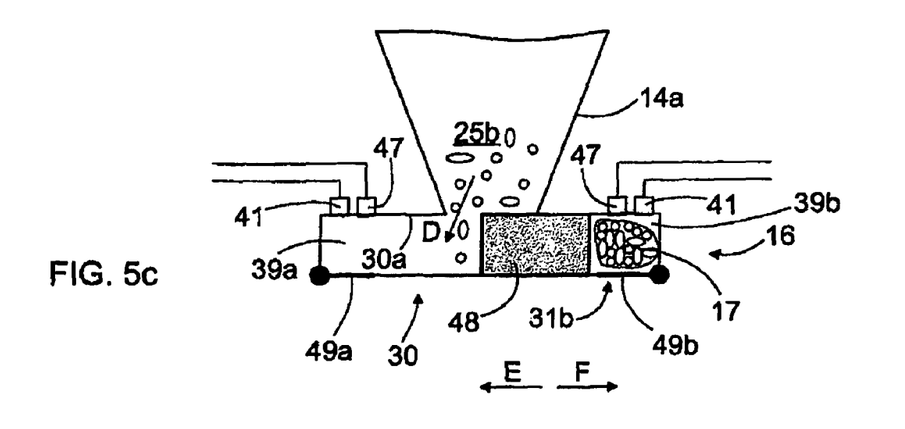

FIGS. 5a to 5c show the structure and operational principles of another discharging device 16 in a very simplified manner. The discharging device 16 is a displacement feeder that may comprise a slide 48 that is arranged to move back and forth in a compression chamber 30. For the sake of clarity, the actuating means of the slide 48, such as pressure medium cylinders, crank mechanism, or the like, are not shown in FIGS. 5a to 5c. When the slide 48 moves into a first direction E, it forms together with the inner surface 30a of the compression chamber 30 a first compression space 39a and compresses the rock material batch fed into the first compression space 39a into a smaller volume. When the slide 48 has moved as shown in FIG. 5a a desired distance in the first direction of travel E and performed the required compression, a first discharge hatch 49a can be opened to let the compacted and bound solid matter cake 17 to drop out of the compression space 39a. The removal of the cake 17 can be improved by feeding a flow of flushing agent or a pressure pulse from the flushing nozzle 41 into the compression space 39a. Because the cake 17 has a large uniform surface, flushing affects the cake 17 effectively. When the slide has moved toward the first compression space 39a, it opens at the same time a connection between the feed opening 29 and the second compression space 39b so that a new batch of rock material 25b can move as shown by arrow D into the second compression space 39b. A second discharge hatch 49b is at this time closed so the rock material cannot escape outside the discharging device 16. When the first compression space 39a is empty, the first discharge hatch 49a is closed.

In the situation shown in FIG. 5b, the travel direction of the slide 48 is changed and it is moved in another travel direction F toward the second compression space 39b. The slide 48 then closes the feed opening 29 and begins to compress the rock material in the closed second compression space 39b. A binder can be fed from the feed nozzle 47 among the rock material being compressed.

In FIG. 5c, the slide 48 has compacted the rock material so that there is a solid matter cake 17 in the second compression space 39b. The second discharge hatch 49b can then be opened and the cake 17 removed through the second discharge opening 31b. The removal of the cake can be facilitated by feeding from the flushing nozzle 41 a flushing agent flow or a pressure pulse. When the slide 48 has moved to the second compression space 39b, the feed opening 29 opens and rock material 25b can move in the direction of arrow D to the opposite side of the slide 48, in other words, rock material is simultaneously dosed into the first compression space 39a. When the solid matter cake 17 is removed from the second compression space 39b, the second discharge hatch 49b is closed and the travel direction of the slide 48 is again changed. These working cycles can be repeated under the control of the control unit 15.

The discharge hatches 49a, 49b can be arranged closed by means of a spring element or a corresponding means that gives in to a force stronger than a predefined force. In such a case, the discharge hatch 49a, 49b can open when the compression of the rock material batch is at its final stage and the force acting on the surfaces defining the compression space 39a, 39b has become sufficiently high. When the cake 17 drops and the travel direction of the slide 48 is changed, the discharge hatch 49a, 49b is closed by the spring element. On the other hand, some other surface in the compression space 39a, 39b can also be arranged to give, in which case by adjusting the force resisting it, it is possible to affect the strength of the compression. These solutions aim at making the compaction less dependent on the size of the dosed rock material batch and the ability of different rock materials to compact under compression.

It is also possible to arrange a single-acting displacement feeder that doses with the slide one rock material batch at a time into the closing space and compresses the rock material in the closed space into a smaller volume. After the compact cake is formed and removed from the compression space, the slide is returned to its starting position and a new working cycle is performed.

It should be mentioned that the present discharging device 16 could also be applied to dust separators that separate only fine rock material or only coarse rock material.

Figure 6:
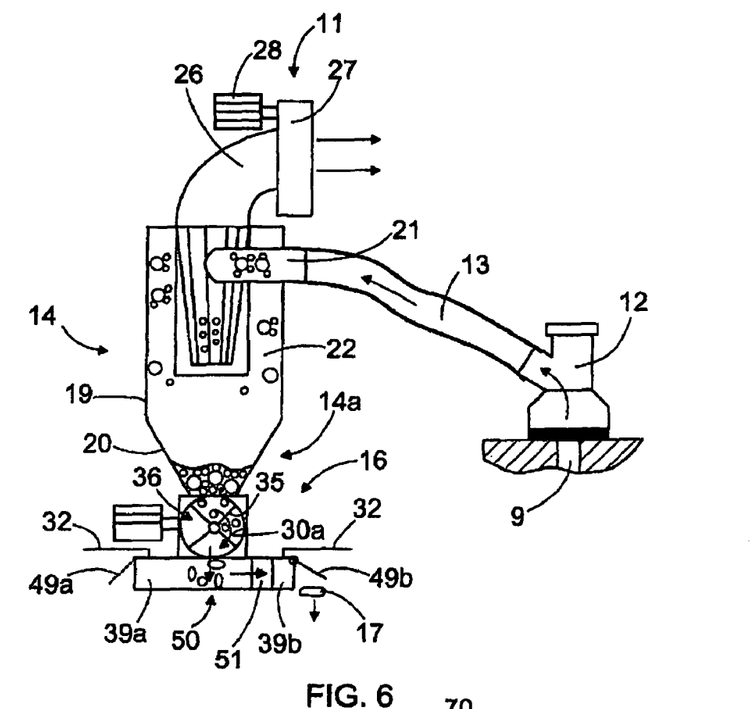
FIG. 6 is a schematic view of another alternative dust collection system.

FIG. 6 shows one alternative arrangement for removing rock material from the discharge part 14a at the bottom of the dust separator 14. The discharge device 16 may comprise a displacement feeder and a press 50. The displacement feeder may be arranged to dose rock material in batches into a compression space 39a, 39b of the press 50. The displacement feeder forms a substantially sealed element between the discharge part 14a of the dust separator and the press 50. The displacement feeder may comprise a rotor 36, whose blades 35 may be substantially tightly against the inner surface 30a of the discharge chamber of the displacement feeder. It should be noted that the displacement feeder could also have some other type of construction. The displacement feeder takes a batch of rock material from the discharge part 14a of the dust separator and moves it to the next step, i.e. for processing in the press 50. The press 50 may have one or more compression chambers 39a, 39b, to which the displacement feeder doses the rock material batch. Further, the press 50 can have one or more compression elements 51, with which rock material in the compression chamber 39a, 39b can be compressed into a smaller volume to form a rock material cake 17. The compression element 51 may be a reciprocating piston or the like that may be arranged in the first travel direction to compress an rock material batch in the first compression chamber 39a, and correspondingly in the second travel direction, it may compress the rock material batch in the second compression chamber 39b. A binder can be fed from a channel 32 into the compression chambers 39a, 39b to facilitate the formation of the cake 17. The compression chambers 39a, 39b may have discharge hatches 49a, 49b or the like that are arranged closed with an element generating a sufficient counter-force, such as a spring, which gives in when a force greater than a predefined force acts on it.

Figure 7:
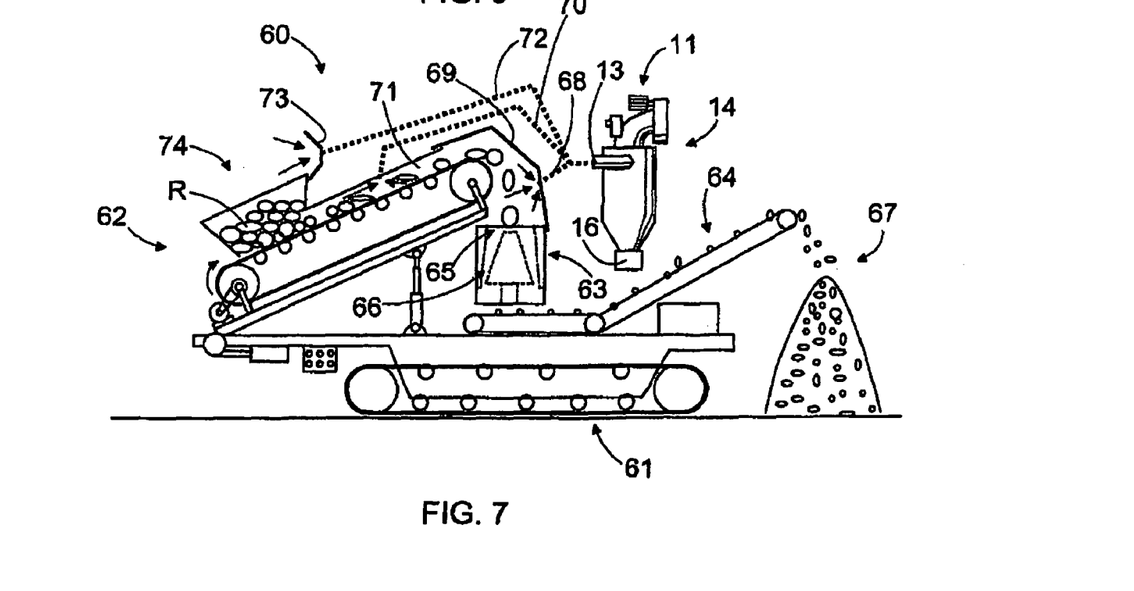
FIG. 7 is a schematic view of a crushing device equipped with a dust separator of the invention.

FIG. 7 shows a crushing device 60 that may comprise a carrier 61, feed conveyor 62, crushing unit 63, and discharge conveyor 64. With the feed conveyor 62, the rock material R being processed is conveyed to a feed opening 65 of the crushing unit 63, from which it is transported to crushing elements 66 that break the rock material R into a small particle size. The crushing elements 66 may for instance be made up of an eccentrically rotating vertical crusher cone and a crushing chamber surrounding it, and the material being processed falls into the wedge-shaped space between the cone and chamber and is crushed into small particles. The material then falls onto the discharge conveyor 64 below the crushing unit 63, with which the crushed rock material can be moved to a suitable unloading site 67. Crushing generates fine-grained rock dust that can be sucked away and processed in a dust separator 14 that has the above-mentioned means for separating rock material and air and a discharging device 16 for compressing the rock material before its removal from the dust separator 14. The suction channel 13 of the dust separator 14 may be connected through a first channel 68 to a hood 69 that may be arranged to surround at least partly the feed opening 65 of the crushing unit 63 and the discharge end of the feed conveyor 62. Further, the suction channel 13 may be connected via a second channel 70 to the inside 71 of the casing surrounding the feed conveyor 62, whereby the dust detaching from the rock material R during transportation can be sucked into the dust separator 14. The suction channel 13 can also be connected via a third channel 72 to a suction funnel 73 or the like that may be arranged to the feed end 74 of the feed conveyor 62 to suck the rock dust released during feeding. Further, rock dust can also be sucked from other than the above-mentioned sites to the dust conveyor 14 as necessary.

Figure 8:
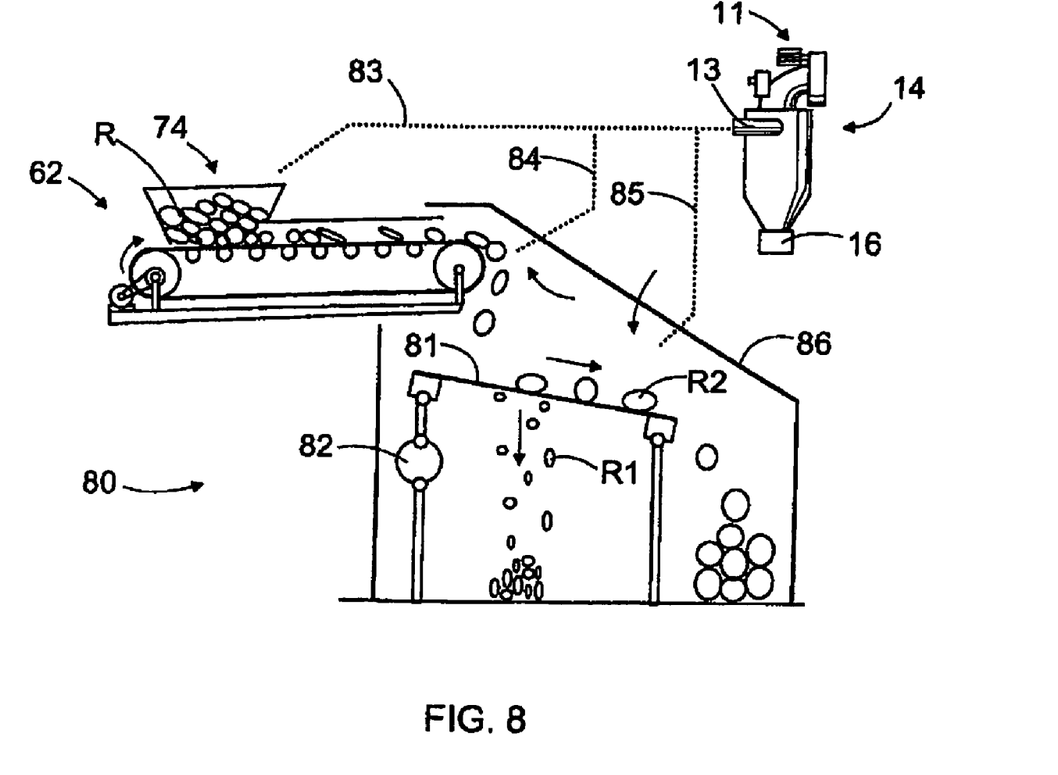
FIG. 8 is a schematic view of a screening device equipped with a dust separator of the invention.

FIG. 8 shows a screening device 80 equipped with a dust collection system that sucks the rock dust released to the environment during rock material screening to the dust separator 14, where the rock material and dust are separated and where the separated rock material is removed with a displacement feeder. In addition, the separated rock material is compressed into a smaller volume to form a rock material cake. The dust separator 14 and the related equipment can be like in the earlier examples. The screening device 80 may comprise a mesh 81, screen, perforated plate or the like, through whose slots or openings small-sized rock material R1 passes, but through which mesh 81 the larger rock material R2 does not pass. The screening device 80 may comprise an actuating means 82, such as a vibrator, with which the mesh 81 can be moved or shaken. The rock dust generated during the processing of the rock material R can be sucked via a first channel 83 from the feed end 74 of the feed conveyor 62 to the dust separator 14, via a second channel 84 from the discharge end of the feed conveyor 62 to the dust separator 14, and further, via a third channel 85 from around the mesh 18 to the dust separator 14. There may be one or more casings 86 at the screening device 80 to prevent the dust from spreading. The spaces defined by the casings 86 can be connected to the dust collection system.

In addition to the above-mentioned applications, rock dust is also formed when rock or concrete is broken with a breaking hammer and a crusher at the end of a boom. The dust collection system and dust separator of the invention can also be used in these applications to prevent dust nuisance.

In some cases, the features presented in this application can be used as such regardless of other features. On the other hand, the features presented in this application can be combined as necessary to form different combinations.

The drawings and the related description are only intended to illustrate the idea of the invention. The invention may vary in detail within the scope of the claims.

The invention claimed is:

1. A method for processing dust when breaking rock, the method comprising:
   sucking broken rock material from a borehole and conveying it to a dust separator;
   separating with the dust separator the rock material and air;
   dosing the separated rock material in batches with a discharging device away from the dust separator;
   removing the rock material from the dust separator with a displacement feeder;
   dosing the rock material in batches with a displacement feeder into at least one closable compression space;
   feeding at least one binder among the rock material in the closed compression space; and
   compressing the rock material in at least one closed compression space into a smaller volume before the rock material batch is discharged from the dust separator.

2. A method as claimed in claim 1, comprising dosing the rock material in batches into at least one closable compression space of the displacement feeder, and compressing the rock material in a closed compression space of the displacement feeder into a smaller volume before the rock material batch is discharged from the dust separator.

3. A method as claimed in claim 1, wherein the at least one binder is fed among the separated rock material before starting to compress it in the compression space.

4. A method for processing dust when breaking rock, the method comprising:
   sucking broken rock material from a borehole and conveying it to a dust separator;
   separating with the dust separator the rock material and air;
   dosing the separated rock material in batches with a discharging device away from the dust separator;
   removing the rock material from the dust separator with a displacement feeder;
   dosing the rock material in batches with a displacement feeder into at least one closable compression space;
   compressing the rock material in at least one closed compression space into a smaller volume before the rock material batch is discharged from the dust separator; and
   further comprising separating in the same dust separator both coarse rock material and fine rock material.

5. A method as claimed in claim 4, comprising dosing the rock material in batches into at least one closable compression space of the displacement feeder, and compressing the rock material in a closed compression space of the displacement feeder into a smaller volume before the rock material batch is discharged from the dust separator.

6. A method as claimed in claim 4, comprising feeding at least one binder among the separated rock material before starting to compress it in the compression space.

7. A dust separator comprising:
   a body;
   at least one suction device for generating suction to the space defined by the body;
   at least one feed channel for directing rock material and air to the dust separator;
   at least one separator for separating rock material from air;
   at least one discharge channel, along which the air that passed through the separator is arranged to exit the dust separator;

at least one discharging device that is connected to the discharge part of the dust separator and arranged to discharge separated rock material in batches from the dust separator;
wherein the discharging device comprising a displacement feeder,
the displacement feeder is arranged to dose the separated rock material in batches into at least one closable compression space,
and the discharging device comprises means for compressing a rock material batch into a smaller volume in at least one closed compression space, and
wherein the discharging device comprises at least one feed nozzle for feeding a binder with feed equipment into the closed compression space.

8. A dust separator as claimed in claim 7, wherein the displacement feeder is arranged to compress the rock material batch into a smaller volume in a closed compression space.

9. A dust separator as claimed in claim 7, wherein the discharging device comprises a displacement feeder and a press, and the displacement feeder is arranged to dose rock material in batches into the press that has at least one compression space and at least one compression element for compressing the rock material batch.

10. A dust separator comprising:
a body;
at least one suction device for generating suction to the space defined by the body;
at least one feed channel for directing rock material and air to the dust separator;
at least one separator for separating rock material from air;
at least one discharge channel, along which the air that passed through the separator is arranged to exit the dust separator;
at least one discharging device that is connected to the discharge part of the dust separator and arranged to discharge separated rock material in batches from the dust separator;
wherein the discharging device comprising a displacement feeder,
the displacement feeder is arranged to dose the separated rock material in batches into at least one closable compression space,
and the discharging device comprises means for compressing a rock material batch into a smaller volume in at least one closed compression space, and
wherein the discharging device comprises at least one flushing nozzle for feeding flushing medium from flushing equipment into the compression space for the purpose of removing the rock material.

11. A dust separator as claimed in claim 10, wherein the displacement feeder is arranged to compress the rock material batch into a smaller volume in a closed compression space.

12. A dust separator as claimed in claim 10, wherein the discharging device comprises a displacement feeder and a press, and the displacement feeder is arranged to dose rock material in batches into the press that has at least one compression space and at least one compression element for compressing the rock material batch.

13. A dust separator comprising:
a body;
at least one suction device for generating suction to the space defined by the body;
at least one feed channel for directing rock material and air to the dust separator;
at least one separator for separating rock material from air;
at least one discharge channel, along which the air that passed through the separator is arranged to exit the dust separator;
at least one discharging device that is connected to the discharge part of the dust separator and arranged to discharge separated rock material in batches from the dust separator;
wherein the discharging device comprising a displacement feeder,
the displacement feeder is arranged to dose the separated rock material in batches into at least one closable compression space,
and the discharging device comprises means for compressing a rock material batch into a smaller volume in at least one closed compression space, and
wherein the dust separator comprises at least one cyclone for separating coarse rock material,
the dust separator comprises at least one filter element for separating fine rock material,
and the dust separator comprises at least one cleaning device for generating a pressure pulse inside the filter element, whereby the separated rock material accumulated on the surface of the element is arranged to drop into the discharge part of the dust separator.

14. A dust separator as claimed in claim 13, wherein the displacement feeder is arranged to compress the rock material batch into a smaller volume in a closed compression space.

15. A dust separator as claimed in claim 13, wherein the discharging device comprises a displacement feeder and a press, and the displacement feeder is arranged to dose rock material in batches into the press that has at least one compression space and at least one compression element for compressing the rock material batch.

16. A dust separator comprising:
a body;
at least one suction device for generating suction to the space defined by the body;
at least one feed channel for directing rock material and air to the dust separator;
at least one separator for separating rock material from air;
at least one discharge channel, along which the air that passed through the separator is arranged to exit the dust separator;
at least one discharging device that is connected to the discharge part of the dust separator and arranged to discharge separated rock material in batches from the dust separator;
wherein the discharging device comprising a displacement feeder,
the displacement feeder is arranged to dose the separated rock material in batches into at least one closable compression space,
and the discharging device comprises means for compressing a rock material batch into a smaller volume in at least one closed compression space, and
wherein the discharging device comprises at least one discharge chamber that has at least one feed opening connected to the discharge part of the dust separator, and that further has at least one discharge opening through which the compressed rock material batch is removed from the displacement feeder,
the discharging device comprises at least one rotor having several radial blades,
the rotor is arranged rotatably in the discharge chamber in such a manner that the blades are arranged substantially tightly against the inner surface of the discharge chamber, two consecutive blades of the rotor and the inner surface of the discharge chamber are arranged to define between them a compression space that is arranged to move from the feed opening of the discharge chamber to the discharge opening as the rotor turns, the rotor blades are flexible, and the rotation axis of the rotor is arranged eccentrically relative to the centre axis of the discharge chamber, whereby, as the rotor turns from the feed opening of the discharge chamber to the discharge opening, the volume of the compression space is arranged to decrease and make the rock material batch in the compression chamber to compact.

17. A dust separator as claimed in claim 16, wherein the displacement feeder is arranged to compress the rock material batch into a smaller volume in a closed compression space.

18. A dust separator as claimed in claim 16, wherein the discharging device comprises a displacement feeder and a press, and the displacement feeder is arranged to dose rock material in batches into the press that has at least one compression space and at least one compression element for compressing the rock material batch.

19. A dust separator comprising:

a body;

at least one suction device for generating suction to the space defined by the body;

at least one feed channel for directing rock material and air to the dust separator;

at least one separator for separating rock material from air;

at least one discharge channel, along which the air that passed through the separator is arranged to exit the dust separator;

at least one discharging device that is connected to the discharge part of the dust separator and arranged to discharge separated rock material in batches from the dust separator;

wherein the discharging device comprising a displacement feeder, the displacement feeder is arranged to dose the separated rock material in batches into at least one closable compression space, and the discharging device comprises means for compressing a rock material batch into a smaller volume in at least one closed compression space, and wherein the discharging device comprises a slide that is arranged to move back and forth between a first compression space and a second compression space, the slide is arranged, when moving in a first direction of travel, to compress the rock material in the first compression space into a smaller volume and at the same time to open a connection between the feed opening and the second compression space, whereby a new batch of rock material is arranged to move into the second compression space, the slide is arranged, when moving in a second direction of travel, to compress the rock material in the second compression space into a smaller volume and at the same time to open a connection between the feed opening and the first compression space, whereby a new batch of rock material is arranged to move into the first compression space, and the compression space has an opening discharge hatch, through which the compressed rock material batch is arranged to exit at the end of the compression step.

20. A dust separator as claimed in claim 19, wherein the displacement feeder is arranged to compress the rock material batch into a smaller volume in a closed compression space.

21. A dust separator as claimed in claim 19, wherein the discharging device comprises a displacement feeder and a press, and the displacement feeder is arranged to dose rock material in batches into the press that has at least one compression space and at least one compression element for compressing the rock material batch.

22. A rock-drilling rig that comprises:

a movable carrier;

at least one drilling boom with at least one drilling unit comprising a rock drill machine;

a dust separation system consisting of at least one dust separator, at least one suction funnel at the drilling unit, at least one feed channel, and at least one suction channel for transporting the drilling cuttings formed during drilling from the suction funnel to the feed channel of the dust separator;

wherein the dust separator further comprises:

a body, at least one suction device for generating suction to the space defined by the body, at least one separator for separating rock material from air, at least one discharge channel, along which the air that passed through the separator is arranged to exit the dust separator, at least one discharging device that is connected to the discharge part of the dust separator and arranged to discharge separated rock material in batches from the dust separator, and the discharging device comprising a displacement feeder, wherein the displacement feeder is arranged to dose the separated rock material in batches into at least one closable compression space, and the discharging device comprises means for compressing a rock material batch into a smaller volume in at least one closed compression space, and wherein the dust separator comprises at least one cyclone for separating coarse rock material, the dust separator comprises at least one filter element for separating fine rock material, and the dust separator is located on the drilling boom.

23. A discharging device of a dust separator for compressing rock material comprising:

at least one discharge chamber that has at least one feed opening and at least one discharge opening;

at least one rotor having several radial blades, which are flexible, wherein the rotor is arranged rotatably in the discharge chamber in such a manner that the blades are arranged substantially tightly against the inner surface of the discharge chamber, two consecutive blades of the rotor and the inner surface of the discharge chamber are arranged to define between them a compression space that is arranged to move from the feed opening of the discharge chamber to the discharge opening as the rotor turns, and the rotation axis of the rotor is arranged eccentrically relative to the centre axis of the discharge chamber, whereby, as the rotor turns from the feed opening of the discharge chamber to the discharge opening, the volume of the compression space is arranged to decrease and make the rock material batch in the compression chamber to compact.

* * * * *